United States Patent

Mohr et al.

[15] 3,651,406

[45] Mar. 21, 1972

[54] SYSTEM FOR PLURAL CHANNEL SIGNAL RECEPTION AND READOUT AND METHOD OF OPERATION

[72] Inventors: John G. Mohr, Woodburn, Ind.; Ross G. Stacer, Niles, Ill.

[73] Assignee: The Magnavox Company, Ft. Wayne, Ind.

[22] Filed: Oct. 3, 1969

[21] Appl. No.: 863,473

[52] U.S. Cl. ............................ 325/304, 325/305, 325/475

[51] Int. Cl. ............................ H04b 1/12

[58] Field of Search ..................... 325/304, 305, 303, 40, 42, 325/44, 47, 52, 56, 59, 473, 474, 475, 476, 306, 478, 479, 480

[56] References Cited

UNITED STATES PATENTS

| | | | |
|---|---|---|---|
| 3,302,115 | 1/1967 | Shiki | 325/304 |
| 3,341,778 | 9/1967 | Dryden | 325/305 |
| 3,365,666 | 1/1968 | Reynders | 325/304 X |
| 3,496,460 | 2/1970 | Martin | 325/473 X |
| 3,479,599 | 11/1969 | Molik | 325/478 X |

*Primary Examiner*—Robert L. Griffin
*Assistant Examiner*—Kenneth W. Weinstein
*Attorney*—Richard T. Seeger

[57] ABSTRACT

The invention pertains to a radio receiver system, and to a method of operation thereof, in which two channels having the same message thereon are received. The noise levels in the respective channels are measured and the two channels are continuously sampled proportionately on the basis of sampling the quieter channel for a greater length of time than the noisier channel. The samples are combined and the resulting composite signal has a better signal to noise ratio than either channel before sampling. A proportionately combined binary representing signal with its improved signal to noise ratio is further enhanced by bit decoding using integration over a full bit period.

12 Claims, 7 Drawing Figures

INVENTORS
JOHN G. MOHR
ROSS G. STACER

BY Jeffers and Young
ATTORNEYS

INVENTORS
JOHN G. MOHR
ROSS G. STACER
BY Jeffers and Young
ATTORNEYS

INVENTORS
JOHN G MOHR
ROSS G. STACER

BY Jeffers and Young
ATTORNEYS

SYSTEM FOR PLURAL CHANNEL SIGNAL RECEPTION AND READOUT AND METHOD OF OPERATION

This invention is concerned with navigation satellite system receivers and especially with an arrangement for improving the signal to noise ratio at the receiver.

Navigation satellite systems are, of course, well known and consist of a satellite orbiting in an exactly known orbit and continuously broadcasting a signal which, when received by a receiver on a ship, may be employed for determining the exact position and bearing and speed of the ship. Other information can also be included in the message broadcast by the satellite.

It is customary with satellites of this nature to have two signal channels, one broadcasting the message on a higher frequency carrier, for example, a 400 MHz carrier and one broadcasting the message on a lower frequency carrier, a 150 MHz carrier, for example. The two channels are provided to permit correction for second order refraction effects on the respective signals. The two signals, being at different frequencies, are refracted by known differing amounts in passing through ionization, density variations and other inhomogeneities of the atmosphere when the satellite passes from the relative positions of horizon to zenith as compared to the receiver. This causes a Doppler like shift in the RF carriers and these known differing amounts can be utilized to eliminate these false Doppler shifts from that due to the true relative motion between the transmitter and receiver. This true Doppler shift coupled with the digital information from the satellite and the bearing and speed of the receiver can be employed in making precise determinations in the position of the receiver on the face of the earth.

The receiver on the ship which receives the signals transmitted by the satellite extracts the Doppler frequency shift from each signal, and decodes the message which is phrase modulated on the signals from the satellite. Each signal is modulated with the same message and, with the exception of the negligible Doppler shift on the message, the messages in the two channels are in synchronism whereby combination of the signals of the two channels is possible.

The present invention, based on the fact that the messages on the two channels are in synchronism, yields a higher signal to noise ratio in the message read out from the receiver than would normally be possible by reading either channel by itself.

The invention, in brief, measures the noise level in each channel at the receiver and automatically and continuously selects proportionately more from that channel which has the best signal to noise ratio. In this manner superior read outs are obtained over what has been possible heretofore. Increasing the signal to noise ratio in the read out signal is important because the signals can have a great deal of noise therein, even under the best conditions, and under poor conditions the message can be lost completely.

Having the foregoing in mind, a primary objective of the present invention is the provision of a receiver system for receiving messages from satellites, particularly navigational satellites, in which the message signal strength is greatly improved so that the message read out is made more certain.

Another object of the present invention is the provision of a receiver system of the nature referred to which can be embodied in substantially conventional navigation satellite systems with little change.

A further object is the provision of a receiver arrangement for simultaneously receiving two carrier waves which may be at different frequencies, both bearing the same message, and for continuously sampling the message from both channels proportionately to the signal to noise ratio in the respective channel.

A salient object of the present invention is the provision of a scheme for deriving a measure of the signal to noise ratio in a received signal.

A still further object of the present invention is the provision of a scheme for reliably distinguishing a binary 0 from a binary 1.

The foregoing objects as well as other objects and advantages of the present invention will be better understood upon reference to the following detailed specification taken in connection with the accompanying drawings in which:

FIG. 1 schematically illustrates, in block diagram form, the portion of a conventional navigational satellite receiver system which has been modified in conformity with the present invention;

The navigation satellite system receiver is a dual channel receiver designed to receive a 400 megacycle and a 150 megacycle signal both of which contain the same and synchronous digital doublet data which phase modulates the RF carriers. These signals which are transmitted by the navigation satellite can at times have extremely poor signal to noise ratios. By combining these signals in a proportion depending upon the noise levels of the respective channels and by processing the resultant combined signals as described herein, the desired signals, the magnitudes of which may at times be actually exceeded by the magnitudes of accompanying noise, can be utilized by the system.

By using two carrier frequencies, the Doppler shifts can be predicted and measured. The second order refraction effects, due to the fact that the satellite transmits through varying thicknesses and other irregularities of atmosphere depending upon the relative positions of the satellite and the earth bound receiver, can be determined and removed thereby allowing for a determination of the relative velocity between the satellite and the receiver. Additional unsuspected benefits may be derived from the fact that two radio frequency channels containing the same modulation information are available, however, the present invention has utility in single carrier situations as well.

Figure 2:
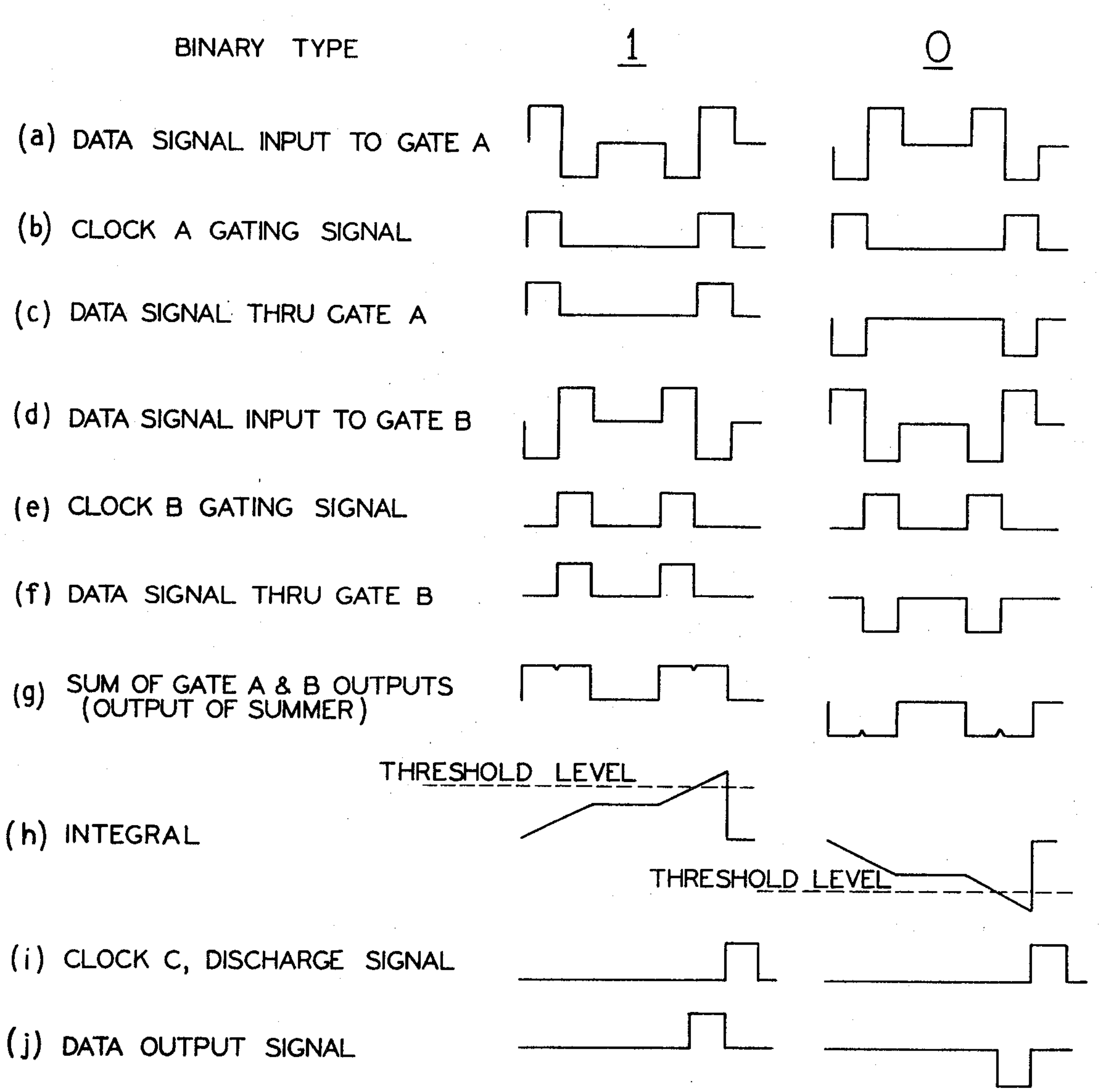
FIG. 2 illustrates a series of wave forms showing how a binary 1 is distinguished from a binary 0 in the bit decoder of the present invention.

It is possible to determine the signal to noise ratio of each channel and to proportionally combine the data from the individual channels to yield a resultant signal which has a signal to noise ratio substantially better than any of the individual channels. The doublet data signal $E_s$ as shown in FIG. 2 is amenable to a further unique processing scheme for reducing the probability of mistakenly identifying a received bit.

Figures 1, 5:
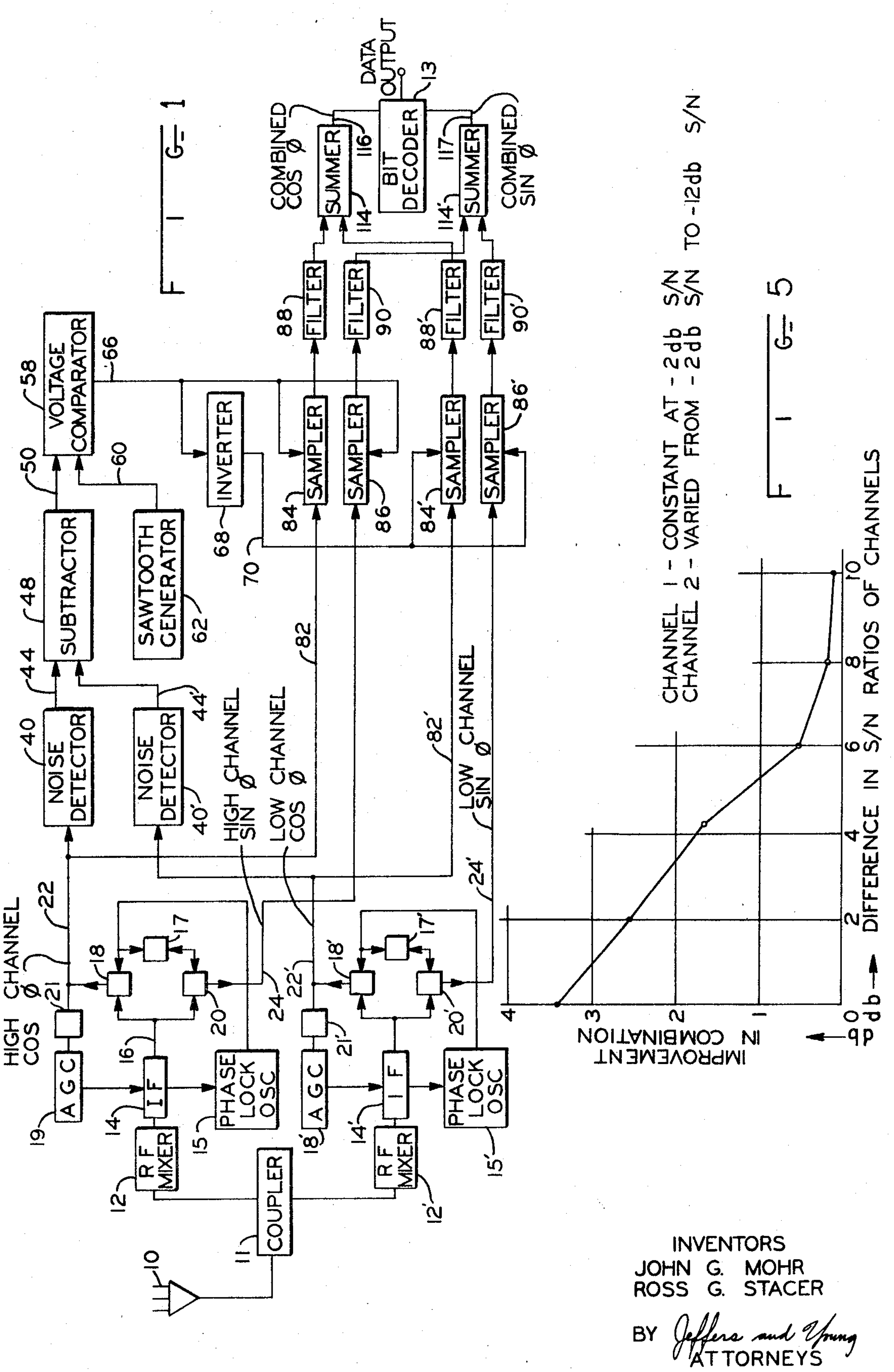
FIG. 5 is a graph showing the results obtained by using the present invention.

Referring to the drawings somewhat more in detail, in FIG. 1, 10 represents the antenna of the two channel receiver carried by the ship. The antenna receives both the 400 MHz carrier and the 150 MHz carrier from the navigation satellite and each carrier is, as previously mentioned, phase modulated with one and the same message. The operation of the so-called high and low channels is substantially identical and therefore only the high channel will be described in detail, it being understood that the low channel operates in a similar fashion. In the block diagram of FIG. 1, blocks identified by a prime are to be considered as being substantially identical in function to those identified by the un-primed reference numeral. The high and low channel signals or carriers are separated in the coupler 11 and the 400 megacycle carrier is passed through a filter and preamplifier or RF mixer 12 and then passes through an IF amplifier 14. The message modulation on each carrier accounts for only about 50 percent of the total energy and is contained in a band width of only about 1.5 kHz. This is established by a conventional crystal filter in the IF amplifiers 14 and 14′ and is not illustrated for the sake of simplicity. The IF amplifier 14 in conjunction with the associated synchronous detectors and feedback circuitry comprises a coherent automatic gain control system, not illustrated in greater detail because, per se, it forms no part of the present invention, except as it operates in combination. The 400 megacycle carrier with its signal is then delivered to synchronous detectors 18 and 20 and from each of which a signal is supplied to the wires 22 ans 24 respectively. The signals in the wires 22 and 24 are 90 electrical degrees apart and it is therefore convenient to refer to the signal on wire 22 as a cosine signal and the signal on wire 24 as a sine signal, or in the alternative, to the signal on wire 22 as channel "*a*" and that on 24 as channel "*b*".

More specifically, the sin output supplied to wire 24 is the phase modulated message detected and converted to amplitude signals. The cosine signal supplied to wire 22 comprises a signal, the mean amplitude of which is proportional to the amplitude of the respective carrier.

To see why this is true, assume that the signal at 16 is given by $e_1 \sin(wt+\phi)$, that is, it is a phase modulated signal and in our specific digital case $\phi=0°, \pm 60°$. The synchronous detector 18 combines multiplicatively this signal with an unmodulated replica (a reference signal equal in phase and frequency to the IF carrier) of the signal from the phase lock oscillator 15 as:

$$E=e_1e_2 \sin(wt+\phi) \sin wt$$

where $e_1$ and $e_2$ represent the peak values of the respective input signals. Application of well known trigonometric identities yields $$E=½e_1 e_2 [\cos(-\phi)-\cos(2wt+\phi)]$$

which is separated into a "carrier" component $$-½e_1e_2 \cos(2wt+\phi)$$

and the detected component $$½e_1e_2 \cos\phi.$$

Similarly, the product formed by synchronous detector 20 is given by $$E=e_1e_2 \sin(wt+\phi) \sin(wt+90°)$$
$$=e_1e_2 \sin(wt+\phi) \cos wt.$$

Note that the last term in this product is changed from the previous situation due to the 90° phase shift introduced by the phase shifter 17. Again, relatively straightforward application of the trigonometric identities gives $$E=e_1e_2 [\sin(2wt+\phi) + \sin\phi]$$

which again represents a "carrier" component $$e_1 e_2 \sin(2wt+\phi)$$

and an information component $$e_1e_2 \sin\phi.$$

Figure 6:
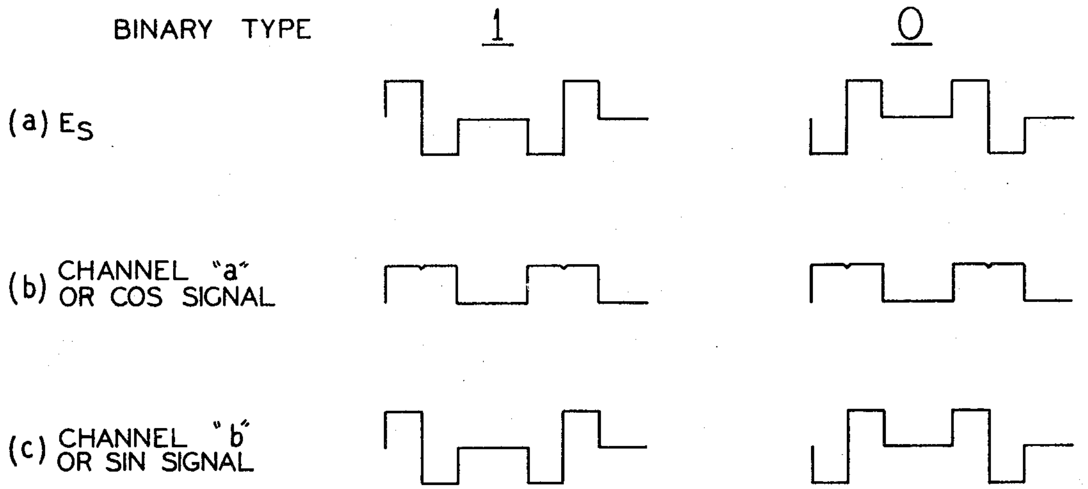
FIG. 6 illustrates the wave forms of typical doublet signals representing a binary 1 and 0 and the resultant cosine and sine channel signals of the present invention.

Thus, the information components of the cosine and sine outputs of the respective synchronous detectors for 0 and 1 doublet data signals $E_s$ take the forms illustrated in FIG. 6. The cosine output signal is identical for either the 0 or 1 doublet signal and in effect, that portion of the doublet signal $E_s$ appearing below the horizontal reference line has been inverted to appear above the line.

The reason for denominating the "*a*" or clocking channel as the cosine channel and the "*b*" or data channel as the sine channel should now be apparent. It should also be apparent that while the entire phase delay has been represented as occuring in the phase shifter 17 other delays may occur in the system which would require a reallocation of this phase shift. Such reallocation is readily implemented subject to the condition that the two inputs to the synchronous detector 18 be in phase or 180° out of phase while the two inputs to the synchronous detector 20 should be 90° or 270° out of phase. As noted earlier, the signal on the cosine channel has a mean amplitude which is proportional to the amplitude of the carrier signal at the output of the intermediate frequency amplifier 14. This mean value is used to control the gain of the intermediate frequency amplifier by means of an automatic gain control circuit 19. This automatic gain control 19 has a narrow band pass filter 21 at its input which causes the system to be responsive to the average carrier value. The gain of the IF amplifier is thus controlled by the automatic gain control such that it is substantially inversely proportional to the level of the FM carrier or signal and may be expressed as $$A=K(1/S)$$

where $K$ is a constant and $S$ is the signal magnitude. This coherent automatic gain control action causes the output signal level of the synchronous detector to remain substantially constant even though the signal may be accompanied by very high levels of noise.

For a better understanding of the noise detection aspect of the present invention, the amplifier 14 has an input represented in magnitude by $S^2+N^2$ where $S$ is the magnitude of the data signal and $N$ that of the noise. As noted earlier, the amplifier gain is $K/S$ and therefore the amplifier output $E_o$ may be expressed as $$E_o=K/S \quad S^2+N^2$$

In situations where a relatively high noise to signal ratio exists, i.e., where $N$ exceeds $S$ by a substantial amount, this relationship for the amplifier output $E_o$ is simplified and expressed as $$E_o=KN/S$$

Thus, by maintaining a relatively constant average signal data level in the cosine channel, the noise output of the synchronous detector of that channel is a good approximation of the signal to noise ratio of the associated RF channel.

The noise level is therefore detected from the cosine channel and, as will be seen in FIG. 1, the cosine channel output is connected to the input of a respective noise detector 40 by wire 22.

The noise detector 40 which may be simple diode detectors supplies a direct current analog voltage signal to its respective output wire 44, which is proportional to the noise in the respective RF signal channel and thus is proportional to the signal to noise ratio of the respective channel.

In brief, the signal to noise ratio of each of the two RF channels (high and low) is measured and an analog voltage proportional to the respective ratio is obtained.

The wires 44 and 44' lead to input terminals of a subtractor 48 which supplies a direct current voltage to wire 50 which represents the difference between the two voltages supplied to the input terminals of the subtractor.

Wire 50 leads to one input terminal of a voltage comparator 58 having a second input terminal to which a wire 60 is connected which leads to the output terminal of a ramp or sawtooth generator 62. Sawtooth generator 62, in a well known manner, provides a sawtooth voltage wave to wire 60 at a predetermined frequency.

Voltage comparator 58 has an output line 66 to which rectangular voltage pulses are supplied at the frequency of the saw tooth wave from generator 62. These pulses are alternately positive going and negative going and the duration of two successive pulses is equal to the period of the sawtooth wave. The voltage supplied to line 66 by comparator 58 is determined by the conditions at the input terminals of the comparator. Where the voltage on wire 50 is greater than the voltage on wire 60, the voltage on wire 66 is positive and when the opposite condition exists the voltage on wire 66 is negative. It will be appreciated that the output supplied by comparator 58 to wire 66 is a series of pulses at a frequency equal to the frequency of the sawtooth wave on wire 60 and with the pulse duty cycle depending on the level of the voltage supplied by wire 50. In the specific embodiment described, the frequency of the sawtooth generator was 100 kHz. Comparator 58 also supplies its output signal to an inverter 68 which supplies pulses to a wire 70 which are the inverse of the pulses on wire 66. Since the train of pulses on wire 70 is the inverse of the train of pulses on wire 66, it will be evident the duty cycle of the positive pulses in wire 70 will be the same as the duty cycle of the negative portion of the pulses in wire 66 and vice versa.

Wire 66 is connected to one of the input terminals of each of a pair of samplers or choppers 84 and 86. The other input terminals of sampler 84 is connected by wire 82 to wire 22 and the other input terminal of sampler 86 is connected to wire 24. Thus both the cosine and sine portions of the 400 mHz signal are under the influence of the pulse train on wire 66. The samplers 84 and 86 may be in the form of electronic switches which are normally nonconductive so as to prevent signals from passing therethrough but which become conductive upon a positive pulse on wire 66. Samplers 84 and 86 thus transmit the cosine and sine portions of the 400 mHz signal therethrough to respective filters 88 and 90 in accordance with the duty cycle of the effective positive going pulse supplied to wire 66 from comparator 58.

The cosine portion of the 150 mHz signal is conveyed by wire 82' to one input terminal of a sampler or chopper 84' while the wire 24' pertaining to the sine portion of the 150 mHz signal is connected to an input terminal of another sampler of chopper 86'. Control terminals of the samplers 84' and 86' are connected to wire 70 to which a pulse train is supplied by inverter 68 which is the inverse of the pulse train on wire 66. Choppers 84' and 86' thus supply the cosine and sine portion of the 150 mHz signal to respective filters 88' and 90' in conformity with the duty cycle of the positive going pulses in wire 70.

Figure 3:
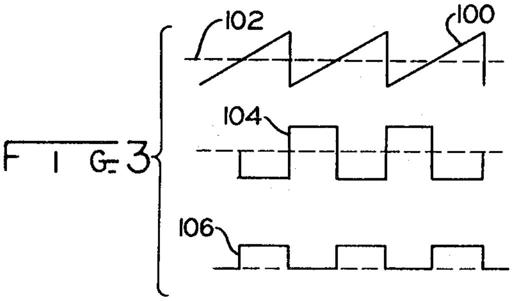
FIG. 3 is a graph showing wave forms as they exist in certain parts of the receiver circuit under one condition of operation.
Figure 4:
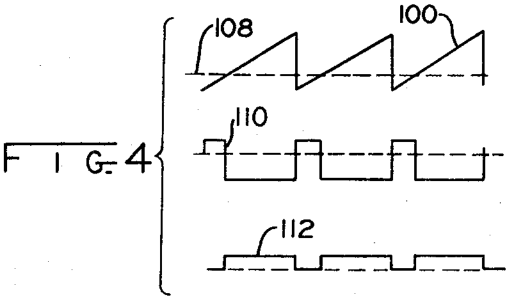
FIG. 4 is a view similar to FIG. 3 but shows another condition of operation.

The manner in which the signals from the voltage comparator 58 and from the inverter 68 appear under different operating conditions is illustrated in FIGS. 3 and 4. In both FIGS. 3 and 4 line 100 represents the output of the sawtooth or ramp generator 62 which is conveyed via wire 60 to one input terminal of voltage comparator 58. In FIG. 3 dash line 102 represents the output from subtractor 48 when the detected noise level in the two signal channels is equal. The points of intersection of dash line 102 with sawtooth wave 100 in FIG. 3 represent the points at which the output voltage of comparator 58 reverses. The output voltage of comparator 58 is indicated by line 104 and it will be seen to comprise positive and negative rectangular half waves of equal duty cycle. The inversion of the form from comparator 58, namely, the output from inverter 68 which is supplied to wire 70 is indicated at 106 in FIG. 3. The effective portions of the outputs of the comparator and inverter are the positive going half waves and it will be seen in FIG. 3 that the positive going half waves or pulses on line 66 are of the same duration as those on line 70. With each of the choppers passing signals when it control terminal goes positive it will be apparent that one-half of each signal is sampled and passed through the chopper to the respective filter.

FIG. 4 shows, by the dash line 108, the supply of a voltage from subtractor 48 to wire 50 smaller than the voltage indicated by line 102 in FIG. 3. The voltage will reduce, as shown at 108 in FIG. 4 when the noise level in the 400 mHz signal is greater than the noise level in the 150 mHz signal. FIG. 4 shows by the line 110 the pulse train on wire 66 and by line 112 the pulse train on wire 70. It will be apparent that samplers 84' and 86' now have a substantially longer duty cycle than choppers 84 and 86 so that the 150 mHz signal supplies a greater portion of the total signal than does the 400 mHz signal.

FIlters 88 and 88' pertaining to the cosine portions of the 400 and 150 mHz signal respectively have their outputs connected to the input side of a summer 114 which combines the respective signals and supplies them as a combined cosine output to wire 116.

Similarly, filters 90 and 90' supply their respective sine channel outputs to a summer 114' wherein the signals are combined and supplied as a combined sine output to wire 117. Filters 88, 88', 90 and 90' serve to filter out undesirable transients.

By way of illustration, the proportional combining of signals in the two channels, as described above results in considerable improvement as is demonstrated in the following example, where $S_1$ = Signal in Channel 1
$N_1$ = Noise in Channel 1
$S_2$ = Signal in Channel 2
$N_2$ = Noise in Channel 2

For the case where $S_1 = S_2$ and $N_1 = N_2$ then $S_1/N_1 = S_2/N_2$ and the signals would be added in equal proportions in accordance with the present invention. The signal voltages being coherent add directly while the noise, being random and approximately Gaussian, adds as the square root of the sum of the squares therefore $$\text{Combined signal} = S_c = S_1 + S_2 = 2S_1$$

$$\text{Combined noise} = N_c = \sqrt{N_1^2 + N_2^2} = \sqrt{2N_1^2} = \sqrt{2}\, N_1$$

and $$S_c/N_c = 2S_1/\sqrt{2}\, N_1 = \sqrt{2}\,(S_1/N_1) = 1.4\,(S_1/N_1)$$

which is a +3 db improvement over the *S/N* ratio of either channel alone. By combining more than two channels, even greater improvement can be realized.

In the specific example set forth above, each channel would be sampled at 50 percent; however, for different noise levels in the respective channels the sampling would be accomplished proportionately and the corresponding improvement may be calculated in a manner similar to the foregoing.

The following table shows the theoretical improvement in the signal to noise ratio for various proportional combinations and even illustrates, under conditions 5 to 10, that slight errors in combining the signals still shows a substantial improvement, particularly in the worst channel.

| Condition | Channel 1 original S/N ratio in db | Channel 2 original S/N ratio in db | Desired combining ratio Ch1/Ch2 | Actual combining ratio Ch1/Ch2 | Resultant S/N ratio in db after combining | **Ch1 | **Ch2 |
|---|---|---|---|---|---|---|---|
| 1 | −2 | −2 | 1/1 | 1/1 | +1 | ±3 | +3 |
| 2 | −2 | −4 | 1.25/1 | 1.25/1 | +.2 | ±2.2 | +4.2 |
| 3 | −2 | −8 | 2/1 | 2/1 | −1.3 | +.7 | +.67 |
| 4 | −2 | −12 | 10/1 | 10/1 | −1.6 | +.4 | +10.4 |
| *5 | −2 | −4 | 1.25/1 | 1/1 | −.2 | +1.8 | +3.8 |
| *6 | −2 | −4 | 1.25/1 | .8/1 | −.4 | +1.6 | +3.6 |
| *7 | −2 | −8 | 2/1 | 1.3/1 | −2.3 | −.3 | +5.7 |
| *8 | −2 | −8 | 2/1 | 1/1 | −3 | −1 | +5 |
| *9 | −2 | −10 | 2.5/1 | 1.3/1 | −3.7 | −1.7 | +6.3 |
| *10 | −2 | −10 | 2.5/1 | 1.33/1 | −3.7 | −1.7 | +6.3 |

*Conditions with errors in actual combining.
**Resultant improvement of S/N ratio in db for each channel after combining.

The preceding chart represents a relative wide range of combining ratios. If the two signal to noise ratios differ by more than 8 db, the noisiest channel may be caused to automatically shut off because no substantial improvement can be realized by combining the channels under such circumstances.

In most cases, the direct combining of the channels at, say, 0 db difference in the signal to noise ratios *db. somewhat over the* 3 db theoretical improvement.

As the signal to noise ratio in one channel changed from, say, −2 to −12 db while the other is maintained at, say −2 db, the amount of improvement decreased to about 0.25 db. FIG. 5, in which actual measured improvement in decibels plotted against difference in signal to noise ratios in decibels illustrates the foregoing. It is understood that although the present embodiment describes dual channel operation, the invention may be applied to more than two channels.

The outputs of the summers 114 and 114' may of course be supplied directly to any type of utilization circuitry desired; however, in the inventive embodiment illustrated by FIG. 1, the output cosine and sine signals from the summers are supplied to a bit decoder 13 via leads 116 and 117 respectively. The bit decoder whose operation will be later apparent, processes the 1 and 0 enhanced doublet signals by integrating each doublet of each binary bit with the result that the message is detected or read with a high degree of certainty under very poor, namely, negative signal to noise ratios. Typically, message threshold is considered to be the signal level at which the bit error probability is one error for each 1,000 bits. THis occurs for a signal to noise ratio in the message of minus 6 db. The relationship between the bit error probability and the signal to noise ratio bears such a relation that a relatively small improvement in the signal to noise ratio near threshold produces a significant improvement in the bit error probability.

Figure 7:
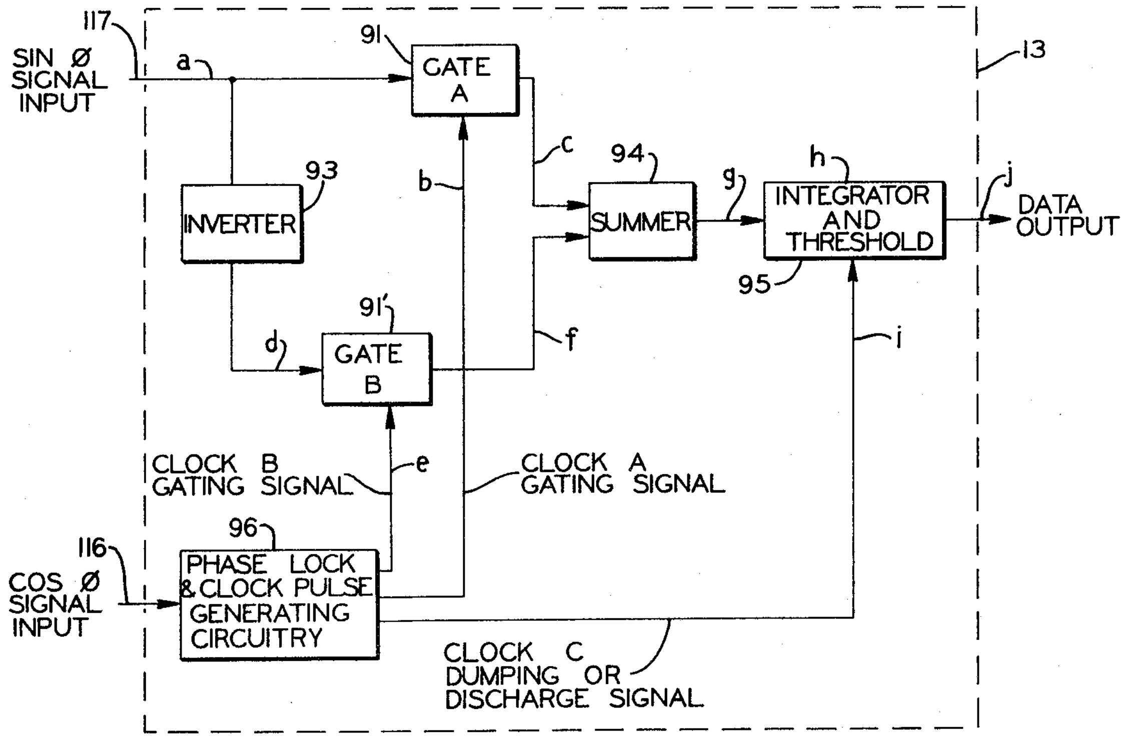
FIG. 7 illustrates in more detail, the bit decoder of FIG. 1.

The process of bit detection or processing which occurs in the bit decoder of FIGS. 1 and 7 is graphically illustrated in FIG. 2 where those wave forms in the left hand column represent a binary 1 and those in the right hand column represent a binary 0. The bit decoder 13 is shown as being responsive to the combined cosine channel output and the combined sine channel output, however, such a bit decoder could be utilized in conjunction with a single carrier signal and for example be responsive to the high channel cosine $\phi$ and the high channel sine $\phi$ outputs.

In the bit decoder, the doublet signals representing a binary 1 are operated upon so that the negative portion of the doublets are inverted thus producing a pair of positive going pulses, at half the original doublet rate, or each binary bit. The doublet signals representing a binary 0 are similarly operated upon to produce the same resultant wave form, except that they are negative going pulses. These resultant pulses representing either a binary 1 or 0 depending upon their polarity, are integrated over the bit period and the integrated signal is compared against a fixed reference or threshold level whereupon exceeding that level produces a decoder output pulse the polarity of which is determined by and indicates whether the doublet signal bit input to the decoder is a 1 or 0.

The sine $\phi$ data signal from summer 144' is supplied to a conventional signal gating circuit 91 and similarly to gate 91' after being inverted in polarity by the signal inverter 93, thus the data signal inputs to the gates are out of phase as evidenced by the wave forms *a* and *d* of FIG. 2. THe clock gating signal *b* for gate 91 allows either the positive going portion of the doublet pulse of the binary 1 bit or the negative of the 0 bit to be passed to the summer or adder 94. In a like manner the clock gating signal *e* allows the positive going pulse portions of the inverted binary 1 doublet bit or the negative of the inverted binary 0 bit to be passed to the summer 94. Thus, the combined output of the gates at the summer 94 consist of a pair of positive going pulses *g* for each binary 1 input signal to the decoder or a pair of negative going pulses for each binary 0 input signal. By means of the integrator, threshold and output pulse circuitry 95, these pulse pairs are integrated over the bit period for example, by a conventional integrating amplifier. The resultant integrated signals are then compared to a predetermined threshold level operating such that when the integral reaches the threshold level there is caused a data output pulse *j* to be produced which for example as shown in FIG. 2 may be a positive going pulse for a binary 1 integrated signal or negative for a binary 0 signal. The decoder thus indicates the presence of the appropriate binary bit input signal, a clock *c* signal *i*, is supplied to the integrator to cause its discharge at the end of each integrating period to enable it to integrate the next incoming signal. This clock signal may for example activate a switching circuit to discharge the integrator. The clock gating and discharge pulses *b*, *e*, and *i* of FIG. 2 are supplied by the phase lock and pulse generator 96. The cosine $\phi$ signal FIG. 6*b* from summer 114 may be used to phase lock a signal generated at the doublet rate from which the before mentioned clock pulses are produced by conventional pulse generating circuitry.

The details of the bit decoder 13 are shown in FIG. 7 and include the combined sine channel input line 117 and the combined cosine channel input line 116. It should be remembered that the sine channel 117 is the source of input signals having information thereon while the cosine channel is to be used for clocking purposes. The bit decoder consists of a first gate 91 which is effective when energized to pass the input signals, an inverter 93 and a second gate 91' which is effective when energized to pass the complement of the input signals. A clock or timing circuit 96 provides the signals for enabling the gates 91 and 91' as well as providing a gate sampling pulse for a discharge pulse which is effective to periodically return the value of the integral in the integrating and threshold circuit 95 to 0. The gates 91 and 91' are never energized simultaneously and as will appear subsequently in discussing the wave forms of FIG. 2, these gates are so timed that the signals presented to the summer 94 are all of the same polarity.

Returning now to FIG. 2 wherein the left hand column of wave forms are related to the operation of FIG. 7 when presented with a binary 1 while the right hand column of wave forms are related to the operation of FIG. 7 when the bit decoder is receiving a binary 0. The specific wave forms involved in the operation of FIG. 7 and the reason for their selection is probably best understood by first considering the desired end product. It is desired to identify or distinguish the information signals by transforming them into either an entirely non-negative wave form or and entirely non-positive wave form, integrating this pulsated direct current wave form and making a positive identification as to the type of bit only if that integral exceeds a specified threshold. THus, in the specific example shown in FIG. 2 it is desired to transform the one data bit into a series of positive pulses and this is accomplished by providing a clocking signal to the gate 91 which allows the positive portions of the original data bit pass through and applying a different clocking signal to the gate 91' which allows the formerly negative portions of the original data bit (not inverted) to pass through to the summer, thus the summer adds a pair of positive pulses passing through the gate 91 and another pair of positive pulses passing through the inverter and the gate 91' to yield the pair of double pulses illustrated as the summer output. The specific gating signals for the gates 91 and 91' may, for example, be derived by doubling the input clocking signal and then applying standard digital counting and combining techniques to yield the desired gating wave forms. A 0 data signal is seen to be the inverse of a 1 signal and hence precisely the same gating signals to the gates 91 and 91' are effective to pass negative portions of the wave form through the gate 91 and inverted positive portions of the wave form through the gate 91' to yield a sum which is a pair of pairs of negative pulses. The summer output is then integrated and if this integral exceeds the predetermined positive or negative threshold values, the signal is identified as the appropriate bit. The clocking system 96 also provides a periodic discharge signal to return the value of the integral held in the integrating and threshold circuit 95 to 0. It should be appreciated that inversion may be equally well performed after the gating and that integration may occur for each line separately either before or after inversion and prior to summation.

From the foregoing it will be seen that the present invention proposes a new and advantageous method of receiving plural channel signals to optimize the signal to noise ratio and enhance the distinguishability of the received message. This system operates continuously and automatically and requires no attention whatsoever to produce the best output signal and reliable readout of the message even under adverse signal to noise conditions. It will be understood that the noise content of the respective signals will change rapidly and continuously and in a completely unpredictable manner and the advantage of having a system according to the present invention continuously monitoring the channels to determine the respective signal to noise ratios therein and sampling the channels in conformity therewith will be evident. The present invention also has obvious utility where the same carrier is received, for example, by two different antennas as well as many other environments different from that of the disclosed preferred embodiment and accordingly the scope of the present invention is to be measured only by that of the appended claims.

What is claimed is:

1. A device for receiving information which is simultaneously impressed on a plurality of signal carrying channels comprising:

first means for determining the signal to noise ratio of the respective channel signals;

controllable means for combining the respective channel signals;

second means responsive to said first means for controlling said controllable means;

means for integrating said combined respective channel signals;

means for identifying said combined respective channel signals if said integral exceeds a predetermined threshold; said means for identifying comprising:

first and second gate means;

means supplying the output of said controllable means as input signals to said first gate means;
inverter means for inverting said input signals and for supplying said inverted signals to said second gate means; and
timing means for providing a plurality of timing signals, said timing means effective to nonsimultaneously enable said first and second gate means to selectively pass portions of said input and said inverted input signals.

2. The device of claim 1 wherein the means for integrating and means for identifying comprises:
first and second gate means;
means supplying the output of said controllable means as input signals to said first and second gate means;
timing means for providing a plurality of timing signals, said timing signals effective to nonsimultaneously enable said first and second gate means to selectively pass portions of said input signals;
first means for integrating the signals passing through said first gate means;
second means for integrating and inverting the signals from said second gate means;
means for combining the signals from said first and second means; and
threshold means for identifying an input signal as being of a certain type when said integral exceeds a prescribed value.

3. The device of claim 1 further comprising means for periodically causing the value of the integral in said integrating means to return to 0.

4. A method of receiving a message simultaneously impressed on two signals in the form of carrier waves of respectively different frequency which comprises; receiving the signals on respective channels of a two channel receiver, detecting the noise level in each channel, at a certain point along the respective channel, sampling the channels alternately after detecting the noise level therein and summing the samples to provide a composite signal, comparing the detected noise levels, generating a control signal which varies in one direction when a designated one of said channels is noisier than the other and in the other direction when said other channel is noisier than said designated channel, and continuously varying the duration of the samples taken from the respective channels in response to the variations in said control signal so the noisier channel is sampled for a proportionately shorter length of time than the quieter channel.

5. The method according to claim 4 in which the sampling of a channel is interrupted when the level of the noise detected therein exceeds a predetermined amount.

6. The method according to claim 4 wherein the gain in each channel is controlled in response to the amplitude of the respective carrier wave and at a point along the said channel which is ahead of the point where the noise level is detected.

7. A device for receiving information which is simultaneously impressed on a plurality of signal carrying channels comprising:
first means for determining the signal to noise ratio of the respective channel signals;
controllable means for combining the respective channel signals;
second means responsive to said first means for controlling said controllable means;
means for integrating said combined respective channel signals;
means for identifying said combined respective channel signals if said integral exceeds a predetermined threshold;
said means for identifying comprising:
first and second gate means;
means for supplying the output of said controllable means as input signals to said first gate means;
inverter means for inverting said input signals and for supplying said inverted signals to said second gate means;
timing means for providing a plurality of timing signals, said timing means effective to nonsimultaneously enable said first and second gate means to selectively pass portions of said input and said inverted input signals;
means for combining the portions of said signals passed by said first and second gate means and for supplying the combined signals to said means for integrating; and
threshold means for identifying an input signal as being of a certain type when said integral exceeds a predetermined value.

8. The device of claim 7 further comprising means for periodically causing the value of the integral in said integrating means to return to 0.

9. The device of claim 7 wherein said input signals comprise binary 1's and 0's, the combined signals are of one polarity for one type of bit and of the opposite polarity for the other type of bit, and wherein said threshold means identifies the one type of bit when the integral exceeds a prescribed value of said one polarity and identifies the other type of bit when said integral exceeds a prescribed value of the opposite polarity.

10. A device for receiving information which is simultaneously impressed on a plurality of signal carrying channels comprising:
first means for determining the signal to noise ratio of the respective channel signals;
controllable means for combining the respective channel signals;
second means responsive to said first means for controlling said controllable means;
means for integrating said combined respective channel signals;
means for identifying said combined respective channel signals if said integral exceeds a predetermined threshold;
said means for identifying comprising:
first and second gate means;
means supplying the output of said controllable means as input signals to said first and second gate means;
inverter means for inverting the output signals from said second gate means;
timing means for providing a plurality of timing signals, said timing means effective to nonsimultaneously enable said first and second gate means to selectively pass portions of said input signals;
means for combining the portions of said signals passed by said first gate means and signals from said inverter means and for supplying the combined signals to said means for integrating; and
threshold means for identifying an input signal as being of a certain type when said integral exceeds a predetermined value.

11. The device of claim 10 further comprising means for periodically causing the value of the integral in said integrating means to return to 0.

12. The device of claim 10 wherein said input signals comprise binary 1's and 0's, the combined signals are of one polarity for one type of bit and of the opposite polarity for the other type of bit, and wherein said threshold means identifies the one type of bit when the integral exceeds a prescribed value of said one polarity and identifies the other type of bit when said integral exceeds a prescribed value of the opposite polarity.

* * * * *